United States Patent
Joe (10) Patent No.: US 6,724,269 B2
(45) Date of Patent: Apr. 20, 2004

(54) PSK TRANSMITTER AND CORRELATOR RECEIVER FOR UWB COMMUNICATIONS SYSTEM

(75) Inventor: Jurianto Joe, Singapore (SG)

(73) Assignee: Cellonics Incorporated Pte., Ltd. (SG)

( * ) Notice: Subject to any disclaimer, the term of this patent is extended or adjusted under 35 U.S.C. 154(b) by 0 days.

(21) Appl. No.: 10/213,481

(22) Filed: Aug. 6, 2002

(65) Prior Publication Data

US 2003/0234696 A1 Dec. 25, 2003

Related U.S. Application Data

(60) Provisional application No. 60/390,580, filed on Jun. 21, 2002.

(51) Int. Cl.$^7$ .................................................. H03B 9/12
(52) U.S. Cl. .................................................. 331/107 T
(58) Field of Search ........................ 331/107 T, 108 C, 331/108 D; 375/307, 306

(56) References Cited

U.S. PATENT DOCUMENTS

| | | |
|---|---|---|
| 3,129,342 A | 4/1964 | Kaenel |
| 3,209,282 A | 9/1965 | Schnitzler |
| 3,239,832 A | 3/1966 | Renard |
| 3,246,256 A | 4/1966 | Sommers, Jr. |
| 3,303,350 A | 2/1967 | Neff et al. |
| 3,312,911 A | 4/1967 | De Boer |
| 3,387,298 A | 6/1968 | Kruy |
| 3,527,949 A | 9/1970 | Huth |
| 3,571,753 A | 3/1971 | Saunders |
| 3,755,696 A | 8/1973 | Nicholson et al. |
| 3,761,621 A | 9/1973 | Vollmeyer et al. |
| 3,846,717 A | 11/1974 | Fleming |
| 3,967,210 A | 6/1976 | Aumann |
| 4,028,562 A | 6/1977 | Zuleeg |
| 4,037,252 A | 7/1977 | Janssen |

(List continued on next page.)

FOREIGN PATENT DOCUMENTS

| | | |
|---|---|---|
| DE | 94 855 | 1/1973 |
| DE | 2459531 A1 | 7/1976 |
| DE | 2602794 A1 | 7/1977 |
| DE | 19809334 A1 | 9/1999 |
| FR | 1438262 | 7/1966 |
| GB | 1036328 | 9/1964 |
| JP | 11-074766 | 3/1999 |
| WO | WO 00/5987 A2 | 2/2000 |
| WO | WO 01/31868 A1 | 5/2001 |
| WO | WO 02/13385 A1 | 2/2002 |

OTHER PUBLICATIONS

Abell, E., "Gated Oscillator Emulates a Flip–Flop," *EDN Access*, pp. 1–2 (1995).

(List continued on next page.)

*Primary Examiner*—My-Trang Nu Ton
(74) *Attorney, Agent, or Firm*—Townsend and Townsend and Crew LLP (57) ABSTRACT

A circuit to generate antipodal PSK signal and a correlator circuit for recovering information from PSK (phase shift keying) UWB transmissions includes providing a circuit component characterized by a transfer function having alternating stable and unstable regions. By setting the operating point in a stable region or an unstable region, a non-oscillatory or an oscillatory output signal can be produced.

26 Claims, 4 Drawing Sheets

U.S. PATENT DOCUMENTS

| | | | |
|---|---|---|---|
| 4,365,212 A | 12/1982 | Gentile et al. | |
| 4,425,647 A | 1/1984 | Collins et al. | |
| 4,459,591 A | 7/1984 | Haubner et al. | |
| 4,560,949 A | 12/1985 | Young | |
| 4,599,549 A | 7/1986 | Mutoh et al. | |
| 4,641,317 A | 2/1987 | Fullerton | |
| 4,743,906 A | 5/1988 | Fullerton | |
| 4,862,160 A | 8/1989 | Ekchian et al. | |
| 5,012,244 A | 4/1991 | Wellard et al. | |
| 5,107,264 A | 4/1992 | Novof | |
| 5,170,274 A | 12/1992 | Kuwata et al. | |
| 5,274,375 A | 12/1993 | Thompson | |
| 5,337,054 A | 8/1994 | Ross et al. | |
| 5,339,053 A | 8/1994 | Lux et al. | |
| 5,345,471 A * | 9/1994 | McEwan | 375/130 |
| 5,459,749 A | 10/1995 | Park | |
| 5,461,643 A | 10/1995 | LaRosa et al. | |
| 5,532,641 A | 7/1996 | Balasubramanian et al. | |
| 5,539,761 A | 7/1996 | Golub et al. | |
| 5,610,907 A | 3/1997 | Barrett | |
| 5,640,427 A | 6/1997 | Ranish | |
| 5,691,723 A | 11/1997 | King et al. | |
| 5,757,301 A | 5/1998 | Kuo et al. | |
| 5,764,702 A | 6/1998 | Caiaffa | |
| 5,777,507 A | 7/1998 | Kaminishi et al. | |
| 5,789,992 A | 8/1998 | Moon | |
| 5,812,081 A | 9/1998 | Fullerton | |
| 5,832,035 A | 11/1998 | Fullerton | |
| 5,892,701 A | 4/1999 | Huang et al. | |
| 5,901,172 A | 5/1999 | Fontana et al. | |
| 6,023,672 A | 2/2000 | Ozawa | |
| 6,044,113 A | 3/2000 | Oltean | |
| 6,060,915 A * | 5/2000 | McEwan | 327/94 |
| 6,060,932 A | 5/2000 | Devlin | |
| 6,087,904 A | 7/2000 | Wen | |
| 6,259,390 B1 | 7/2001 | Joe | |
| 6,275,544 B1 | 8/2001 | Aiello et al. | |
| 6,292,067 B1 | 9/2001 | Sasabata et al. | |
| 2001/0020907 A1 | 9/2001 | Joe et al. | |

OTHER PUBLICATIONS

Gallerani, A., "Oscillator Meets Three Requirements," *EDN Access,* pp. 119–120 (1995).

Goras et al., "On Linear Inductance– and Capacitance– time Conversions Using NIC– Type Configuration," *IEEE Trans. Ind. Electronics,* 40(5):529–531 (1993).

Jakubaschk, V.H., "das Grosse Elektronikbastelbuch," Deutscher Militarverlag, Leipzig, pp. 206–209 (1968).

Keener, J.P., "Analog Circuitry for the van der Pol and FitzHugh—Naguno Equations," *IEEE,* pp. 1011–1015 (1983).

Li et al., "Performance of a Ratio–Threshold Diversity Combining Scheme in FFH/FSK Spread Spectrum Sytems in Partial Band Noise Interference," *IEEE,* Dept. of Electrical and Computer Engineering, and Communication Research Centre, pp. 0672–0676 (1992).

Li et al., "Maximum–Liklihood Diversity Combining in Partial–Band Noise Interference Channel," *IEEE,* Department of Electrical and Computer Engineering, and Communication Research Centre, pp. 507–511 (1993).

Patarasen et al., "Maximum–Liklihood Symbol Synchronization and Detection of OPPM Sequences," *IEEE Transactions on Communications,* 42(6):9 (1994).

Sen et al., "Integration of GaAs/A1As Resonant Tunneling Diodes for Digital and Analog Applications with Reduced Circuit Complexity," (1987).

Tietze et al., "Halbleiter–Schaltungstechnik, Funfte, unberarbeitete Auflage," Springer–Verlag, Berlin, Heidleberg, New york, pp. 255–258 (1980).

Wang et al., "Image Segmentation Based on Oscillatory Correlation," *Neural Computation,* 9:805–836 (1997).

* cited by examiner

PSK TRANSMITTER AND CORRELATOR RECEIVER FOR UWB COMMUNICATIONS SYSTEM

CROSS-REFERENCES TO RELATED APPLICATIONS

This application claims the benefit of U.S. Provisional Application No. 60/390,580, filed Jun. 21, 2002 and entitled "CORRELATOR FOR PHASE SHIFT KEYING ULTRA-WIDE BAND COMMUNICATIONS."

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

On Feb. 14, 2002, the Federal Communications Commission (FCC) issued a First Report and Order for UWB (ultra-wide band) technology, which authorized the commercial deployment of UWB technology. A spectrum mask was released to ensure that UWB signals will not interfere with sensitive devices such as GPS (global positioning) systems. In the spectrum mask, there is a huge continuous bandwidth where the EIRP emission level (in dBm/MHz) is constant from 3.1 GHz to 10.6 GHz that is attractive for UWB communication applications.

Before the introduction of the mask, much of the UWB signaling techniques utilized nanosecond Gaussian pulses which occupy a frequency spectrum from DC to a few GHz. However, with the introduction of the mask by the FCC, most of these systems require modification. Generating nanosecond Gaussian pulses and achieving optimum correlation detection were readily achieved with a very simple system before the FCC ruling. However, after the ruling, useful systems require generating the nanosecond pulses within 3.1 GHz to 10.6 GHz range while at the same time achieving optimum correlation detection. It is not straightforward to convert systems before the ruling to both fit into the current FCC mask and at the same time to achieve optimum correlation detection.

BRIEF SUMMARY OF THE INVENTION

A circuit to generate antipodal PSK signals and a correlator circuit for recovering information from PSK (phase shift keying) UWB transmissions includes providing a circuit component characterized by a transfer function having alternating stable and unstable regions. By setting the operating point in a stable region or an unstable region, a non-oscillatory or an oscillatory output signal can be produced. At the transmitter, in-phase sinewaves are generated by moving operating point from stable region 1 to an unstable region and an out-of-phase sinewave is generated by moving the operating point from stable region 2 to unstable region. This method of generating transmitted signal is used at the receiver to correlate the transmitted signal to achieve optimum detection.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Disclosed below is a very simple and elegant solution for UWB communication systems that satisfies both the FCC mask requirements while achieving optimum correlation detection.

Figure 1:
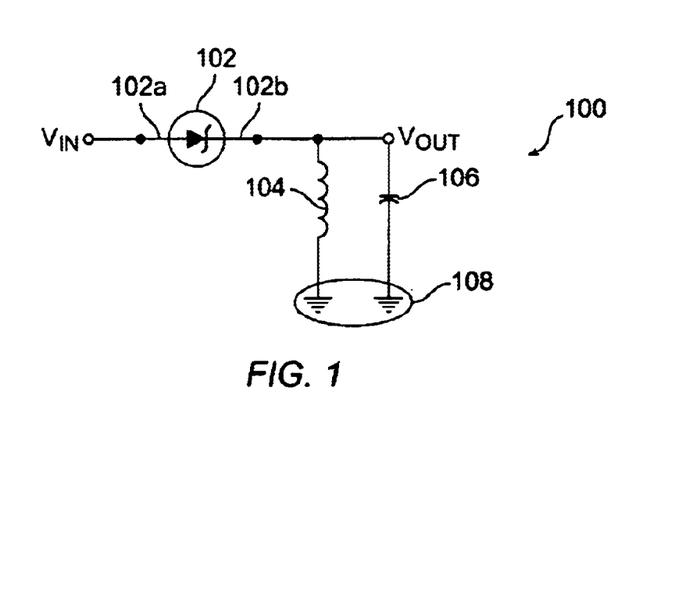
FIG. 1 shows a schematic diagram of a circuit used in accordance with the present invention.

FIG. 1 shows a circuit implementation of an illustrative embodiment of the present invention for generating antipodal signals suitable for UWB transmission in accordance with the invention. U.S. Pat. No. 6,259,390 discloses circuits and circuit dynamics applicable to circuits according to the present invention, and is herein incorporated by reference for all purposes. However, it was discovered that the circuit of the present invention possesses the unexpected behavior of producing oscillatory (e.g., sinusoidal) signals that are continuous (non-discrete), as opposed to oscillatory signals that are discrete pulses as in U.S. Pat. No. 6,259,390. As will become clear below, the output signal of the circuit according to the present invention is well suited to UWB systems.

Generally, such circuits are characterized by a transfer function (I-V characteristic curve) having alternating stable and unstable regions of operation. Thus, when the operating point of such a circuit falls within an unstable region of operation, the circuit produces an oscillatory output signal. Conversely, when the operating point of the circuit fall within a stable region of operation, the circuit output is a generally non-oscillatory signal.

In a particular embodiment of the present invention, FIG. 1 shows an N-type circuit 100 which transfer function has an N-shape curve. The circuit comprises a tunnel diode component 102 having an anode terminal 102a and a cathode terminal 102b. An inductive element 104 is coupled across the cathode terminal and a common reference 108. The inductive element can be a conventional discrete component. Alternatively, it may be desirable to provide this component on an IC (integrated circuit) chip. Integration of tunnel diodes is becoming commercially viable due to advances in fabrication technology. The common reference can be a ground reference, if that is convenient for a particular implementation. The anode terminal is driven by an input signal $V_{in}$. A cathode terminal serves as an output to provide an output signal $V_{out}$. A capacitive element 106 or other appropriate filter component can be coupled across the cathode terminal and the common reference to obtain a smoothing effect of the output signal. Alternative circuit configurations are shown in U.S. Pat. No. 3,209,282 to Schnitzler, and is herein fully incorporated by reference.

Figure 2:
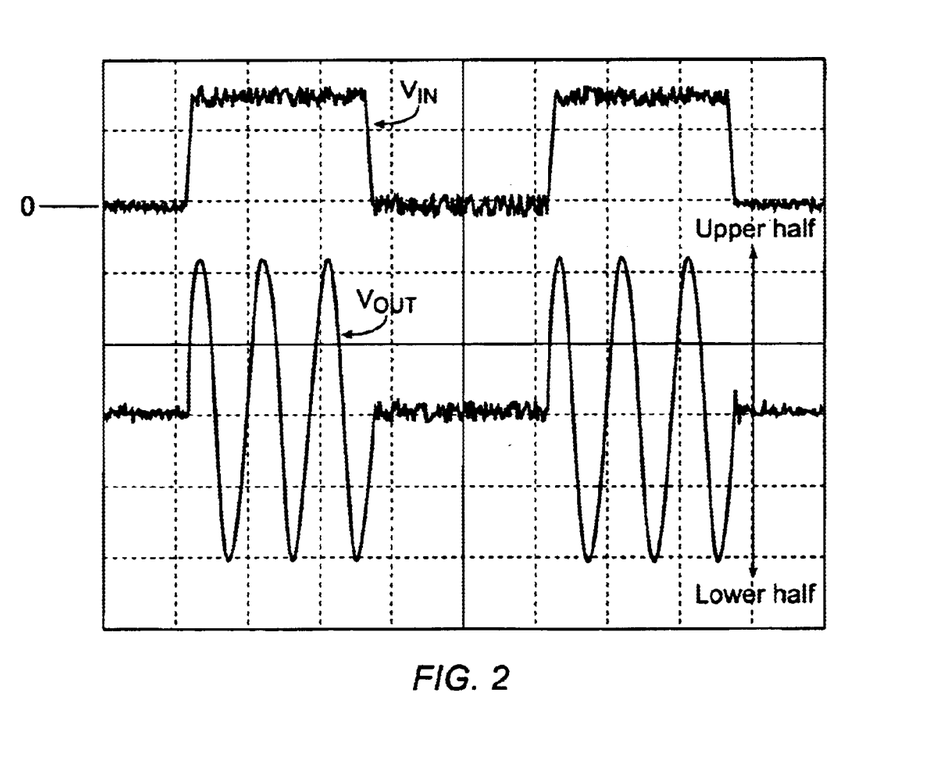
FIG. 2 illustrates the circuit behavior of the circuit shown in FIG. 1.

FIG. 2 represents signal traces of the input signal $V_{in}$ and the output signal $V_{out}$ of the circuit 100 shown in FIG. 1. The input signal is a square wave signal having a given amplitude, A. As the traces show, on the non-zero portions of the input signal (turned on), the circuit responds substantially instantly by producing an oscillatory output signal. Here, a sine wave is produced. The oscillations cease essentially instantaneously when the square wave input signal goes to zero (turned off).

Figure 3:
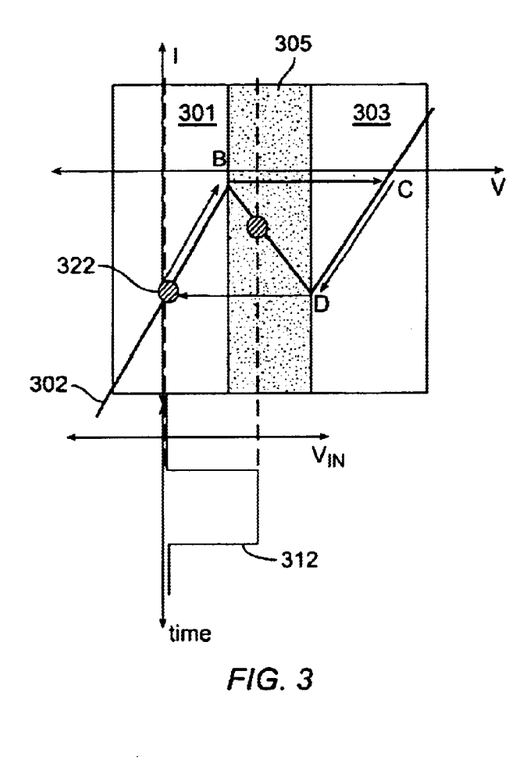
FIG. 3 shows a transfer function of the circuit of FIG. 1.

FIG. 3 shows the dynamics of the circuit 100 when the square wave input signal $V_{in}$ is turned on and off. The circuit is characterized by the I-V transfer function 302 shown in the figure. The positive sloped portions of the transfer function lie in regions 301, 303, where the output signal $V_{out}$ is substantially non-oscillatory. The negative portion of the transfer function lies in a region 305 where the output signal is oscillatory. An operating point 322 of the circuit is determined by the voltage and current that is applied at the input of the circuit. As can be seen the location of the operating point can be adjusted so that its location on the transfer function can lie in an unstable region or in a stable region, thus producing oscillatory output or non-oscillatory output. Stated another way, the circuit can be driven by an appropriate voltage and current level to produce an oscillatory or a non-oscillatory output.

As can be seen in FIG. 3, a square wave input signal is shown. The operating point is in the stable region 301 when the square wave is off. When the square wave is applied, the operating point moves into the unstable region 305, during which time the circuit is oscillating (i.e. producing an oscillatory output). The oscillating path ABCD corresponds to one cycle of sinusoidal waveform generated at $V_{out}$ of the circuit. The path AB in FIG. 3 corresponds to the upper half cycle sinusoidal waveform at $V_{out}$ shown in FIG. 2. In parallel, path CD corresponds to the lower half cycle sinusoidal waveform shown in FIG. 2.

By using this knowledge, we are now ready to generate antipodal sinusoidal waveforms. By controlling operating point to move from stable region to unstable region such that the oscillation starts from A, one will produce a sine wave with no phase shift. This can be achieved by initially placing the operating point in stable region 1 (at point A to be exact). However, if the operating point is moved from stable region to unstable region such that the oscillation starts from C, then a sine wave with 180° phase shift will be generated. This is achieved by placing the operating point in stable region 2 at the beginning (at point C to be exact). Hence, by manipulating the movement of operating point, one can obtain a pair of antipodal signals.

Figure 4:
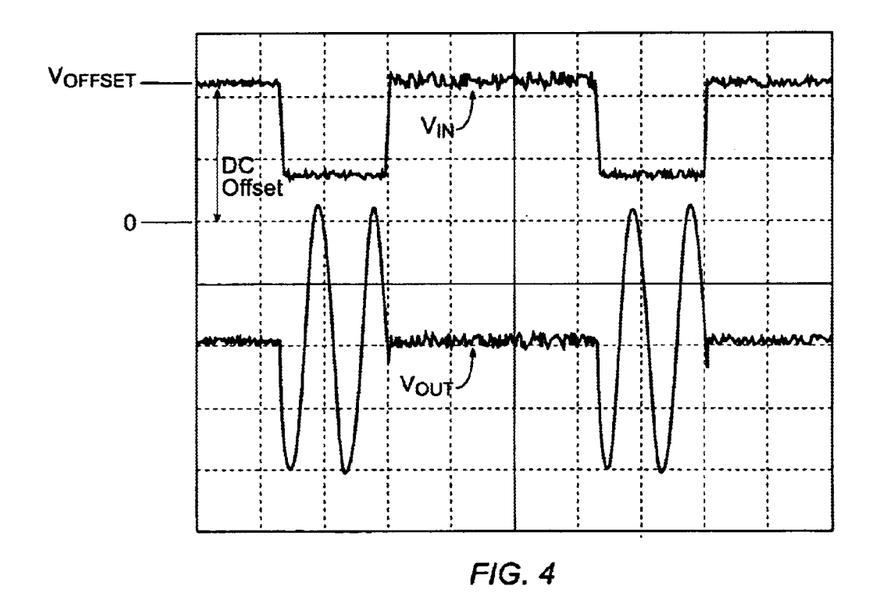
FIG. 4 illustrates additional circuit behavior of the circuit show in FIG. 1.

FIG. 2 is an example where the operating point of the circuit of FIG. 1 is placed in the stable region 301 before it is moved into the unstable region 305, thus producing the resulting output signal $V_{out}$. Purely as a matter of convention, this signal will be referred to as having a zero phase shift. FIG. 4 shows an input signal $V'_{in}$ that has a DC offset $V_{offset}$. The input signal shown in FIG. 4 is a negative-going pulse. The DC offset places the operating point of the circuit at C in the stable region 303. The negative-going pulse moves the operating point of the circuit into the unstable region 305. By operating the circuit so that its operating point moves from C to D, produces the output signal $V'_{out}$. As can be seen the oscillatory signal is 180° out of phase relative to the zero phase shift signal shown in FIG. 2. Thus the signals $V_{out}$ and $V'_{out}$ represent a pair of antipodal signals.

Figure 5:
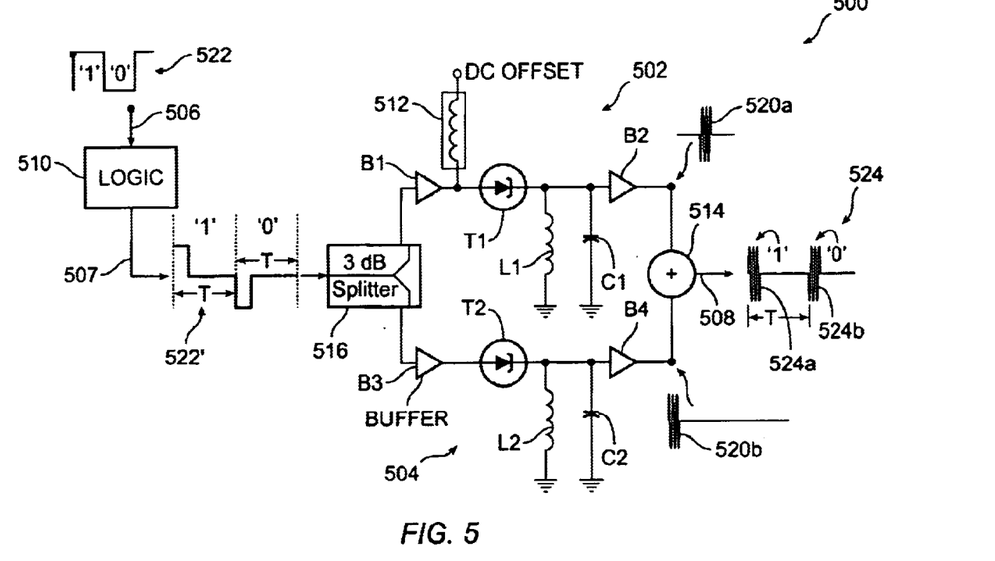
FIG. 5 shows a schematic diagram of a transmission circuit in accordance with an embodiment of the invention.

FIG. 5 illustrates an implementation of an antipodal signal generator 500 in accordance with an embodiment of the present invention, suitable for use in a UWB transmitter circuit 500. The generator circuit comprises two circuit components 502 and 504 which operate in the manner as discussed above. The circuit component 502 comprises a tunnel diode T1 coupled in series with an inductor L1. Anode terminal of the tunnel diode is in electrical communication with a signal 522'. The inductor is coupled between a cathode terminal of the tunnel diode and a reference potential, which can be ground. A capacitor C1 can be provided between the cathode terminal and the reference potential to effect curve-shaping of an output signal at the cathode.

A pull-up device 512 (e.g. a pull-up resistor) coupled at one end to a DC offset is coupled at the other end to an input of the circuit component 502. The pull-up device biases the circuit component so that its operating point in the absence of an input signal is positioned at C, as shown in FIG. 3.

The circuit component 504 is similarly configured with tunnel diode T2, inductor L2, and capacitor C2. There is no pull-up device for the circuit component 504. Consequently, its operating point in the absence of an input signal is at A, as shown in FIG. 3.

Buffers B1–B4 are provided to minimize loading to tunnel diode-inductor circuit. The outputs of the circuit components 502 and 504 are coupled via buffers B2 and B4 respectively to a summing circuit 514. The output 508 of the summing circuit is a signal 524 representative of an input signal 522 to be transmitted.

The input signal 522 feeds into an input 506 of appropriate logic 510 to convert its binary digits to produce positive- and negative-going pulses 522' representative of the input signal 522. In the example implementation shown, a convention is adopted whereby a positive pulse represents a "1" and a negative pulse represents a "0". A splitter 516 is coupled to an output 507 of the logic 510 to receive the positive/negative pulse signal 522'. The signal is split equally and fed to the circuit components 502 and 504 via the buffers B1 and B3, respectively.

The circuit component 504 will respond to the positive amplitude pulse portions of the input signal 522' and produce the "zero" phase oscillations 520b such as those shown in FIG. 2. However, the output of the circuit component 504 will essentially be non-oscillatory when driven by the negative amplitude pulse portions of the input signal. Conversely, the output of the circuit component 502 will essentially be non-oscillatory when drive by the positive amplitude pulse portions of the input signal. However, the circuit component 502 will respond to negative amplitude pulses and oscillate to produce the out-of-phase sinusoidal waveforms 520a such as those shown in FIG. 4. The output of summing circuit 514 combines the outputs of the two circuit components to yield antipodal output signals that constitute the bursts 524a, 524b of in-phase and out-of-phase sinusoidal waveforms that correspond to digital bit '1' and '0' respectively. With proper tuning of the circuit components 502 and 504, these bursts can be of the frequencies that are suitable for UWB transmissions.

Figure 6:
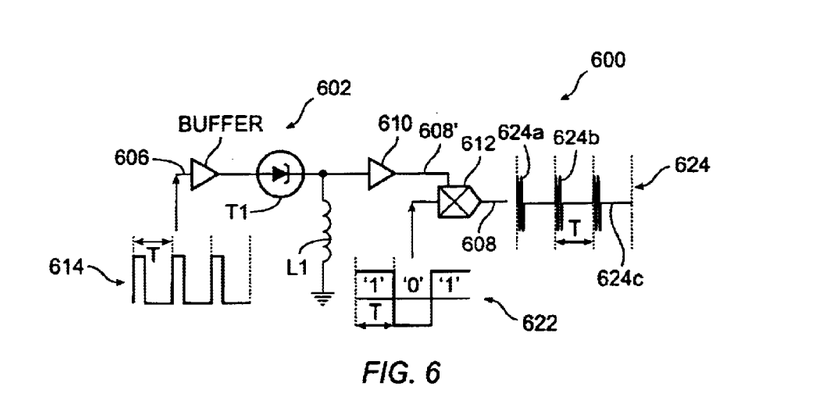
FIG. 6 shows a schematic diagram of a transmission circuit in accordance with another embodiment of the invention.

FIG. 6 shows another implementation example of an antipodal signal generator 600 in accordance with an alternate embodiment of the present invention suitable for use in a UWB transmitter. The generator circuit comprises a circuit component 602 similar to the circuit shown in FIG. 1. A tunnel diode T1 is coupled to an inductor L1. Here, the optional capacitive element (shown in FIG. 1) is not provided. Buffers are provided at the input and output of the circuit component. A pulse train 614 is provided at the buffered input 606. A buffered output 608' is fed into a mixer component 612 to be mixed with an input signal to produce an output signal 624 at the output 608. The mixer can be a conventional RF mixer circuit.

The circuit shown in FIG. 6 can be tuned to operate at 5 GHz, for example. A source of narrow pulses 614 (one nanosecond pulse, for example) repeating at a rate equal to the transmission bit rate T was provided and applied to the buffered input 608. In response, bursts of in-phase sinusoidal waveforms separated by silence periods were produced at the output 608'. These bursts of sinusoidal waveforms can be modulated via the mixer component 612 with an NRZ signal representative of the digital information 622 to be transmitted. The resulting output signal 624 comprises bursts of in-phase 624a and out-of-phase 624b sinusoidal waveforms corresponding to digital bits '1' and '0', separated by periods of silence 624c.

Figure 6A:
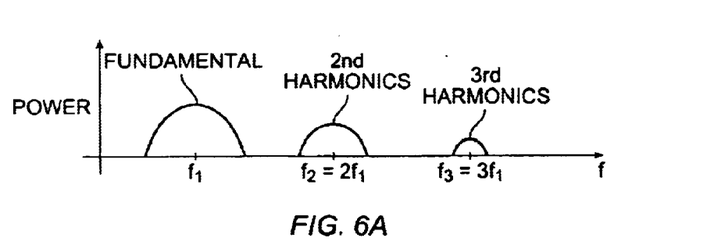
FIG. 6A illustrates the notion of higher harmonics in the signals produce in accordance with the invention.

It can be appreciated that the above circuits can be suitably configured for generating high frequency antipodal signals used in a UWB transmitter. The well understood principles of harmonic frequency generation can be used to produce the much higher frequency components used for UWB signals. In general, if one looks at the spectrum of signal 524 and 624, it can be seen that the signals do not consist only of a single tone, but rather comprise higher harmonics. For example, with the circuit that generates 5 GHz sinewave at fundamental, one can see sinewaves being generated at 10 GHz, 15 GHz, and so on. This is illustrated for example in FIG. 6A.

Thus, if there is a need to generate UWB at 10 GHz, it can be appreciated that one can use the same 5 GHz circuit and amplify only the second harmonics to get 10 GHz UWB signal using appropriate filters and amplifiers. For example, it can be appreciated that the buffer elements B2 and B5 shown in FIG. 5 and buffer element 610 in FIG. 6 can comprise suitable filtering components to extract the desired higher harmonics.

Figure 7:
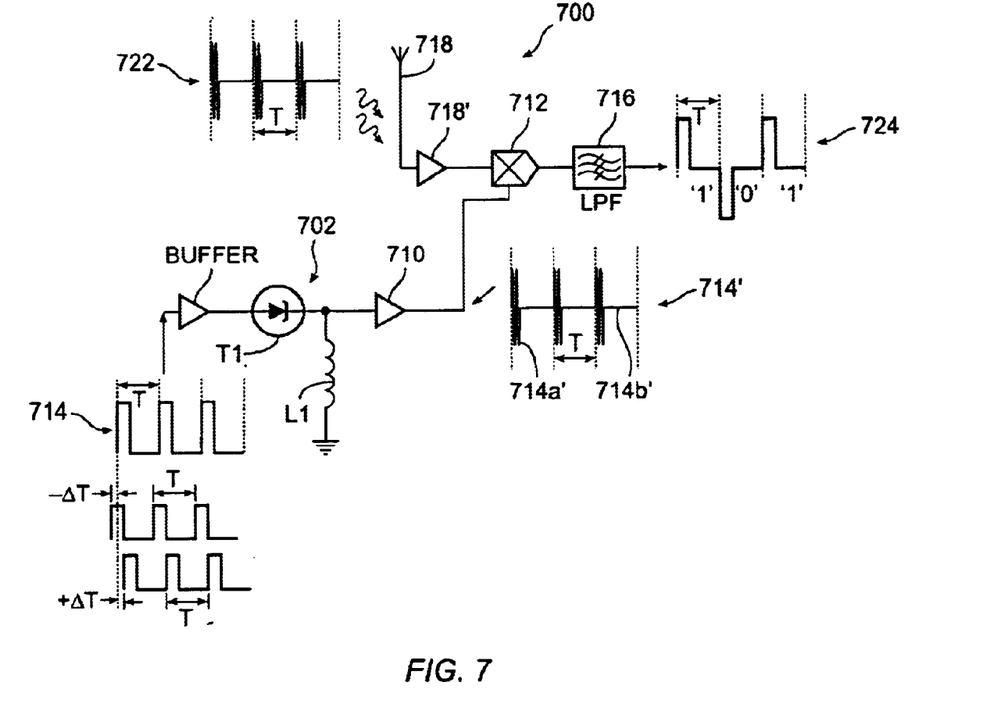
FIG. 7 shows a schematic diagram of a receiver circuit in accordance with an embodiment of the invention.

Referring now to FIG. 7, an implementation of a correlator circuit 700 according to an embodiment of the present invention is shown. The correlator circuit is suitable for extracting a replica of transmitted UWB signals generated in accordance with the invention. A circuit component 702 similar to the circuit shown in FIG. 1 includes a tunnel diode T1 and an inductive element L1. An anode terminal of the tunnel diode is coupled to receive a signal from a pulse source 714. The inductive element is coupled between a cathode of the tunnel diode and a reference potential, which can be ground potential. Input and output buffers are provided. The constitution of the output buffer 710 can include a filtering component to produce higher harmonics as mentioned above.

An antenna 718 receives a transmitted UWB signal 722 and feeds the signal to an amplifier 718' to amplify a received signal. The received signal is fed to an input of a mixing component 712. An output of the mixing component feeds into a low-pass filter component 716.

The pulse source 714 feeds a pulse train (series of pulses) to the circuit 702 which operates the circuit to produce a series of in-phase oscillations (sinewaves with zero degree phase shift) 714a' separated by silence periods 714b'. It can be appreciated that one can design circuit 702 such that it will produce out-of-phase oscillations (sinewaves with 180 degrees phase shift) at the output in response to a pulse at the input. For this reason, circuit 702 can be seen as a gated oscillator where the input pulse 714 provides the gating function. However, circuit 702 is different from conventional gated oscillators in that the sinewave generated at the rising edge of pulse 714 can be of any arbitrary phase. Circuit 702 always generates sinewave with zero degree phase shift at the rising edge of pulse 714. It will be explained that this property can be very useful facilitate synchronization with the incoming pulses.

Continuing then, the signal 714' feeds into another input of the mixing component 712. The signal 714' is matched in frequency and shape with the signal used in the transmitting side. For optimum detection, the phase of signal 714' is in synchronization with either the in-phase or the out-of-phase sinewave at the output of amplifier 718'. When the signal 714' is mixed with the received signal at the output of amplifier 718', a replica of the transmitted signal can be produced on the receiver side, if the circuit parameters of the circuit component 702 are substantially the same as the circuit parameters of the circuit component(s) on the transmitter side (see FIGS. 5 and 6). The mixer's output is passed through the low-pass filter 716. The output signal 724 is a series of positive and negative amplitude pulses spaced by a period T. The positive and negative amplitude pulses correspond to digital bit "1" and "0" and can be converted to conventional binary signals by readily available methods. The output signal 724 from the low-pass filter is therefore representative of the transmitted digital signal.

To facilitate achieving synchronization between the signal 714' and output of amplifier 718', the rising edge of the pulses 714 can be dynamically delayed or advanced in order to achieve maximum correlation between signal 714' and the output of 718'. This aspect of the invention provides a very simple implementation of a commonly known technique called a sliding correlation. The technique can be easily achieved simply by delaying (or advancing) the rising edge of pulses 714 by an amount of plus or minus Δt as shown in FIG. 7.

As can be seen in FIG. 7, the incoming transmitted UWB signal 722 has period T. This signal is amplified by the amplifier 718' and correlated to the internally generated sinewave 714'. Initially, because the receiver does not know the phase of the signal 722, signal 714' is not optimally correlated. However, using conventional baseband processing on the signal 722, a slightly delayed or advanced pulse 714 can be generated to excite circuit 702 in such away that the signal 714' is better correlated to received signal 722. This process of slight delaying or advancing pulse 714 is repeated until maximum correlation is achieved. Conventionally, this is accomplished using various techniques such as analog delay lines, which can be impractical in an ASIC solution.

Figure 7A:
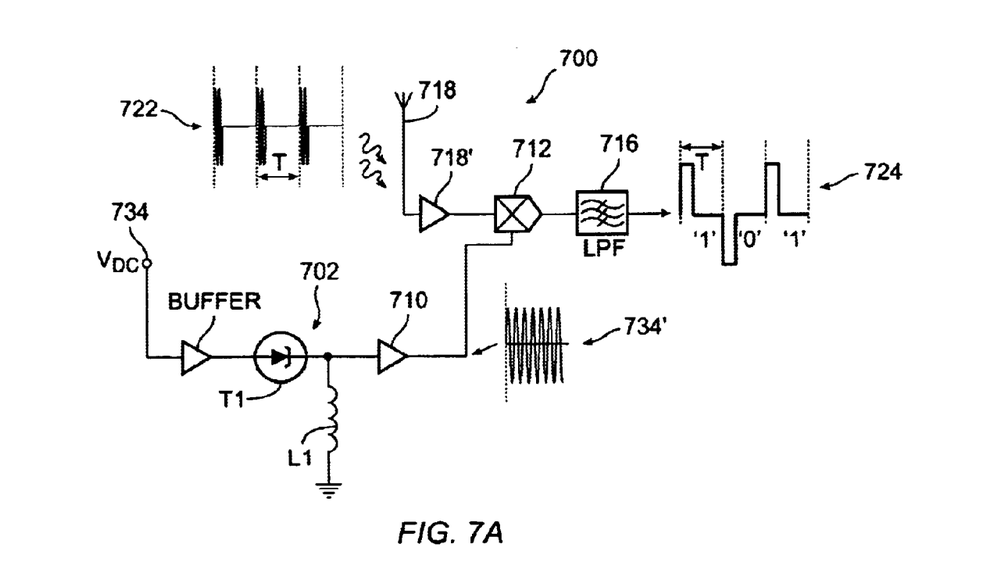
FIG. 7A shows an alternate embodiment of FIG. 7.

FIG. 7A illustrates, in an alternate embodiment, that the pulse source 714 can be replaced by a DC offset 734. The DC offset operates the circuit 702 to produce a continuous oscillatory signal 734' that is absent silence periods. Signal 734' is matched in frequency with the signal used in the transmitting side. It may be desired for optimum detection performance to ensure that the phase of the signal 734' is in synchronization with the in-phase or out-of-phase sinewave generated at the transmitter.

In a correlator circuit, it is important to have an exact replica of the transmitted UWB signal in order to optimize detection. Conventionally, to satisfy FCC regulations, one would perform high pass filtering of a very narrow pulse (typically on the order of sub-nanosecond widths) at the transmitter. To match this signal, the same operation has to be carried out at the receiver. However, whether the matched signal is identical to what is sent at the transmitter is questionable. Another technique is up-conversion; however, this method requires an oscillator at both the transmitter and receiver stations. Conventional oscillators are known to consume significant power.

The circuit shown in FIG. 7 solves many of the foregoing problems. First, the circuit 702 is very simple (only two components are required). Second, circuit 702, when enabled by pulses 714, always produces a sinewave with zero degree phase shift (or 180 degrees phase shift) at the rising edge of the pulse 714. This property is very useful for synchronization and enables the application of a sliding correlator approach by delaying the pulses 714. Third, it does not consume a lot of power because no oscillator is required. Fourth, the waveform generated is easily repeated. The same circuit used in the transmitter to generate transmitted signals can be used at the receiver to generate the matched signal. Also, the correlator circuit is well suited for PSK UWB and can be readily adapted for other UWB modulation schemes such as OOK, PPM, and FSK.

What is claimed is:

1. An ultra wideband (UWB) communication system comprising:

an input terminal for receiving a digital signal to be transmitted as a UWB signal;

an antipodal signal generator comprising a first circuit portion having a transfer function characterized by having an unstable operating region bounded by two stable operating regions, the circuit portion producing a first oscillatory signal when being operated in the unstable region, the circuit portion producing a non-oscillatory signal when being operated in the stable region, the antipodal signal generator further comprising a second circuit portion to effect production of a second oscillatory signal that is substantially 180° out-of-phase relative to the first oscillatory signal; and an output terminal for producing an antipodal signal comprising first and second oscillatory signals separated by periods of silence, wherein the antipodal signal is suitable for UWB transmission.

2. The system of claim 1 wherein the first circuit portion comprises a first tunnel diode having a first terminal and a second terminal, a first inductive element coupled between the second terminal and a ground reference, and a biasing element coupled between the first terminal and a biasing potential, the first terminal coupled to receive the digital signal, the first oscillatory signal being produced at the second terminal, wherein the second circuit comprises a second tunnel diode having a third terminal and a fourth terminal, a second inductive element coupled between the fourth terminal and the ground reference, the third terminal coupled to receive the input signal, the second oscillatory signal being produced at the fourth terminal, the antipodal signal generator further comprising a combining circuit coupled to receive the first and second oscillatory signals to produce the antipodal signal.

3. The system of claim 2 wherein the antipodal signal generator further comprises inverting logic coupled to receive the digital signal and effective to produce an intermediate signal comprising positive-going pulses and negative-going pulses, the positive-going pulses representing a first logic level in the digital signal, the negative-going pulses representing a second logic level in the digital signal.

4. The system of claim 2 wherein the first circuit portion further includes a first capacitive element coupled between the second terminal and the ground reference and the second circuit portion further includes a second capacitive element coupled between the fourth terminal and the ground reference.

5. The system of claim 1 wherein the first circuit portion comprises a tunnel diode having a first terminal and a second terminal, and an inductive element coupled between the second terminal and a ground reference, the antipodal signal generator further including a source of pulses coupled to the first terminal, a mixing component having a first input coupled to the second terminal and a second input coupled to receive the digital signal, the first circuit portion producing an output signal at the second terminal in response to the pulses, the mixing component producing the antipodal signal as a function of the output signal and the digital signal.

6. The system of claim 5 wherein the first circuit further includes a harmonic generation circuit coupled between the second terminal and the first input of the mixing component, the harmonic generation circuit configured to produce a higher harmonic component of the output signal.

7. The system of claim 6 wherein the harmonic generation circuit comprises a filter component to produce the higher harmonic component of the output signal.

8. A signal processing method in a UWB (ultra-wideband) communication system comprising:

receiving a digital signal for transmission;

producing an antipodal signal representative of the digital signal, the antipodal signal comprising first oscillatory signal components and second oscillatory signal components substantially 180° out of phase relative to the first oscillatory components; and transmitting the antipodal signal, the step of producing the antipodal signal including operating a circuit characterized by a transfer function having an unstable operating region bounded by a first stable operating region and a second stable operating region to produce an oscillatory output signal, the first and second oscillatory signal components being based on the oscillatory output signal.

9. The method of claim 8 further including producing a drive signal representative of the digital signal, the driving signal having positive-going pulses and negative-going pulses to represent first and second logic states, respectively, in the digital signal, the step of operating the circuit including driving the circuit with the driving signal, the circuit configured to produce first oscillations when driven by the positive-going pulses of the driving signal, the method further including driving an additional circuit with the driving signal, the additional circuit characterized by a transfer function having an unstable operating region bounded by a first stable operating region and a second stable operating region and configured to produce second oscillations when driven by the negative-going pulses of the driving signal, the first oscillations being substantially 180° out of phase relative to the second oscillations, the first and second oscillatory signal components being based respectively on the first and second oscillations.

10. The method of claim 8 further including driving the circuit with a pulse signal to produce an output signal comprising periods of oscillations and periods of silence, and modulating the output signal with the digital signal to produce the antipodal signal.

11. The method of claim 8 further including producing higher harmonics of the oscillatory output signal, wherein the first and second oscillatory signal components are based on one of the higher harmonics.

12. A signal processing method in a UWB (ultra wideband) communication system comprising:

receiving a transmitted signal to produce a received signal, the transmitted signal representative of a digital signal;

providing an oscillatory signal; and mixing the received signal with the oscillatory signal to produce an output signal representative of the digital signal, wherein providing the oscillatory signal includes driving a first circuit so that it operates repeatedly in a first stable region of operation and then in an unstable region of operation and then in a second stable region of operation and then in the unstable region and then in the first stable region.

13. The method of claim 12 wherein the step of driving the first circuit includes providing a pulse train to an input of the first circuit.

14. The method of claim 12 wherein the step of driving the first circuit includes biasing the first circuit with a DC offset.

15. The method of claim 12 further including varying a phase of the oscillatory signal phase relative to a phase of the received signal.

16. The method of claim 12 wherein the first circuit comprises a tunnel diode having an anode terminal and a cathode terminal, and an inductive element coupled between the cathode terminal and a reference potential, wherein the step of driving the first circuit includes one of applying a pulse train to the anode terminal or applying a DC offset to the anode terminal, wherein the oscillatory signal is based on an output signal at the cathode terminal.

17. A UWB (ultra wideband) system comprising:

a receiver configured to detect a transmitted signal, the receiver having a receiver output to produce a received signal representative of the detected transmitted signal;

a signal generator having a signal output; and mixer having a first input coupled to the receiver output and a second input coupled to the signal output, the mixer having a mixer output to produce a signal representative of data contained in the transmitted signal, the signal generator including a first circuit characterized by having an unstable region of operation bounded by first and second stable regions of operation, the signal output being based on an output of the first circuit.

18. The system of claim 17 wherein the first circuit comprises a tunnel diode having an anode terminal and a cathode terminal, and an inductive element, wherein the inductive element is coupled between the cathode terminal and a reference potential, wherein the signal generator includes a pulse source coupled to the anode terminal to feed a pulse train to first circuit.

19. The system of claim 18 wherein the reference potential is ground potential.

20. The system of claim 17 wherein the first circuit comprises a tunnel diode having an anode terminal and a cathode terminal, and an inductive element, wherein the inductive element is coupled between the cathode terminal and a reference potential, wherein the anode terminal is coupled to a DC offset.

21. A UWB (ultra-wideband) communication system comprising:

means for receiving a transmitted signal to produce a received signal, the transmitted signal representative of a digital signal;

first circuit means for producing oscillatory signals, the first circuit means characterized by a transfer function having an unstable region of operation bounded by a first region of stable operation and a second region of stable operation;

a drive source coupled to drive the first circuit means to produce oscillatory signals; and a mixer having a first input coupled to receive the oscillatory signals from the first circuit means, having a second input coupled to receive the received signal, and having an output representative of the digital signal.

22. The system of claim 21 wherein the first circuit means comprises a tunnel diode having an anode terminal in electrical communication with the drive source and having a cathode terminal in electrical communication with the mixer, and an inductive element coupled between the cathode terminal and a reference potential.

23. The system of claim 22 wherein the drive source is a series of pulses.

24. The system of claim 23 wherein the drive source further includes means for delaying or advancing the series of pulses based on a phase of the received signal.

25. The system of claim 22 wherein the drive source is a DC offset.

26. The system of claim 21 wherein the received signal is an antipodal signal.

* * * * *